US005974262A

United States Patent [19]

Fuller et al.

[11] Patent Number: 5,974,262

[45] Date of Patent: Oct. 26, 1999

[54] SYSTEM FOR GENERATING OUTPUT BASED ON INVOLUNTARY AND VOLUNTARY USER INPUT WITHOUT PROVIDING OUTPUT INFORMATION TO INDUCE USER TO ALTER INVOLUNTARY INPUT

[75] Inventors: Terry A. Fuller, Rydal; Aarne H. Reid, Meadowbrook, both of Pa.

[73] Assignee: Fuller Research Corporation, Rydal, Pa.

[21] Appl. No.: 08/911,752

[22] Filed: Aug. 15, 1997

[51] Int. Cl.[6] .......... G06F 13/38

[52] U.S. Cl. .......... 395/838; 600/425; 600/301; 600/545; 600/546; 395/500; 395/835

[58] Field of Search .......... 600/301, 425, 600/545, 546, 587; 364/578; 395/500, 838, 835

[56] References Cited

U.S. PATENT DOCUMENTS

| | | | |
|---|---|---|---|
| Re. 34,728 | 9/1994 | Hall-Tipping | 364/413.04 |
| 3,855,998 | 12/1974 | Hidalgo-Briceno | 128/2.1 B |
| 4,049,262 | 9/1977 | Cunningham, Jr. | 272/1 R |
| 4,088,125 | 5/1978 | Forgione et al. | 128/2.1 Z |
| 4,149,716 | 4/1979 | Scudder | 273/1 E |
| 4,170,225 | 10/1979 | Criglar et al. | 128/733 |
| 4,195,626 | 4/1980 | Schweizer | 600/587 |
| 4,358,118 | 11/1982 | Plapp | 273/85 G |
| 4,461,301 | 7/1984 | Ochs | 128/630 |
| 4,632,126 | 12/1986 | Aguilar | 128/732 |
| 4,792,896 | 12/1988 | Maclean et al. | 395/500 |
| 4,812,126 | 3/1989 | Gilliksen | 434/238 |
| 4,852,031 | 7/1989 | Brasington | 364/578 |
| 4,949,726 | 8/1990 | Hartzell et al. | 128/731 |
| 5,016,213 | 5/1991 | Dilts et al. | 364/900 |
| 5,047,952 | 9/1991 | Kramer et al. | 364/513.5 |
| 5,089,960 | 2/1992 | Sweeney, Jr. | 364/410 |
| 5,163,690 | 11/1992 | Davis et al. | 273/460 |
| 5,209,494 | 5/1993 | Spector | 273/460 |
| 5,213,338 | 5/1993 | Brotz | 273/460 |
| 5,213,555 | 5/1993 | Hood et al. | 482/57 |
| 5,240,417 | 8/1993 | Smithson et al. | 434/61 |
| 5,253,168 | 10/1993 | Berg | 600/301 |
| 5,288,078 | 2/1994 | Capper et al. | 273/148 B |
| 5,362,069 | 11/1994 | Hall-Tipping | 273/438 |
| 5,441,047 | 8/1995 | David et al. | 128/670 |
| 5,465,729 | 11/1995 | Bittman et al. | 600/545 |
| 5,466,200 | 11/1995 | Ulrich et al. | 482/4 |
| 5,470,081 | 11/1995 | Sato et al. | 273/438 |
| 5,474,082 | 12/1995 | Junker | 128/732 |
| 5,482,051 | 1/1996 | Reddy et al. | 600/546 |
| 5,546,943 | 8/1996 | Gould | 600/425 |

*Primary Examiner*—Thomas C. Lee
*Assistant Examiner*—Michael G. Smith
*Attorney, Agent, or Firm*—Seidel, Gonda, Lavorgna & Monaco, PC

[57] ABSTRACT

An interactive computer system responsive to a user's voluntary and autonomic nervous system responses. The interactive computer system includes a computer, a voluntary input device requiring intentional actuation by the use, a sensor to detect autonomic nervous system responses, an interface device, and an output device. The voluntary input devices and output devices communicate with the computer. The sensors detect autonomic nervous system signals of a user and generate signals representative of the responses. The interface device communicates with the sensors and the computer. The interface device conditions the signals generated by the sensors and transmits the signals to the computer. The computer is responsive to the signals and produces an output command which is in part dependent upon the signals. The output device responds appropriately to the output command produced by the computer.

33 Claims, 7 Drawing Sheets

| Physiological Signal | Source | Transducer |
|---|---|---|
| Electrocardiogram (ECG) | Bio-electric potential from the heart | Silver-silver chloride electrodes. Conductive contact |
| Electromyogram (EMG) | Bio-electric potential associated with muscular action | Silver-silver chloride electrodes. Conductive contact |
| Galvanic Skin Response | Perspiration and related ANS activity from emotional arousal | Silver-silver chloride electrodes. Conductive contact |
| Electrodermal Response | Bio-electric properties of skin | Silver-silver chloride electrodes. Conductive contact |
| Rheoencephalographic Response | Bio-electric properties associated with tissue of the head | Silver-silver chloride electrodes. Conductive contact |
| Blood Pressure | Blood within arteries, maintained by contraction of heart and elasticity of vascular system | Pressure gauge<br><br>Plesmograph |
| Respiration Rate | Frequency of breathing | Strain gauge configured to detect force around the user's chest responsive to lung volume<br><br>Thermocouples<br><br>Resistive temperature devices configured to sense air flow from the nostrils |
| Arterial and venous blood flow | Blood pumped within the vascular system | Ultrasonic doppler |

FIG. 2

| Physiologic Response | Acute Stress | Anxiety | Excitement | Embarrassment | Fear | Relaxation |
|---|---|---|---|---|---|---|
| Heart Rate | ↑ | ↑ | ↑ | ↑ | ↑ | ↓ |
| Blood Pressure | ↑ | ↗ | ↑ | - | ↑ | ↓ |
| Respiration | ↗ | - | - | - | ↑ | - |
| Galvanic Skin Resistance | ↗ | - | - | ↑ | ↑ | - |

"↑" indicates a large increase

"↗" indicates a small increase

"-" indicates no change

"↓" indicates a large decrease

FIG. 4

SYSTEM FOR GENERATING OUTPUT BASED ON INVOLUNTARY AND VOLUNTARY USER INPUT WITHOUT PROVIDING OUTPUT INFORMATION TO INDUCE USER TO ALTER INVOLUNTARY INPUT

FIELD OF THE INVENTION

The invention relates to an interactive computer system and method responsive to a user's voluntary inputs and autonomic nervous system responses.

BACKGROUND OF THE INVENTION

The devices used by people to interact with computers have dramatically changed over the past few decades. As the speed and processing power of computers have increased, the devices and methods for interaction between man and computer have improved. Voluntary input devices such as the mouse, joystick, touch pad, touch screen, and keyboard have been developed to make computers easier to use.

In 1972, Pong™, one of the first video computer games, was introduced. In that game, a simulated ball would "bounce" over a line between opposite sides of a monitor screen, as a tennis ball bounces over a net from one side of the court to the other. A paddle, analogous to a tennis racquet, was controlled by the player and used to direct the "ball" from the player's side of the screen to the opposite side of the screen. If the ball passed the player's paddle, the player would lose the point. The Pong™ game entertained thousands of people and helped begin the video game revolution.

Video computer games of many different kinds are now available, both for arcade and home play. Video computer games can be categorized as fighting, adventure, role playing, puzzle, sporting, racing, and simulation games. This list of categories is not intended to be exhaustive. Other categories and categorization schemes may exist.

Fighting games are characterized by a one-on-one contest between the player's character and another character. The other character can be controlled by either the computer or a second player. The object is to win the contest.

In an adventure game, the player's character is on a journey through a graphical world where he is confronted by other characters and obstacles. Points are awarded to the player for various actions, such as killing an evil character, retrieving an item, or reaching a goal. The object is to achieve the highest point score.

In a role playing game, the player is on an imaginary journey and encounters numerous obstacles, such as evil characters, collapsed bridges, quicksand, trap doors, and the like. In order to remain in the game, the player must overcome these obstacles. The object of the game is to complete the journey.

The player in a puzzle game must solve a puzzle. The difficulty of the game may be increased by imposing time constraints, increasing the difficulty of the puzzle itself, or by imposing some other limitation. The goal is to solve the puzzle within the given constraints.

In sporting games, the player controls simulated athletes or equipment in a sporting event, such as a football, baseball, hockey, or basketball game. The dexterity and strength of the simulated athletes, or the behavior of the equipment, such as a golf club and golf ball, is programmed into the game. The player's object is to win the sporting event.

Racing games are a hybrid of sporting games and adventure games. The player in a racing game navigates a vehicle in a race or on a mission. The object of the game is to finish the race or mission before any other competitor or in the shortest time.

Simulation games mimic the experience of operating an actual vehicle such as an aircraft, tank, or submarine. The object of the simulation is to master control of the vehicle while attempting to destroy an enemy or complete an obstacle course.

In existing video computer games, the computer's output is based solely on the voluntary responses of a user through a voluntary input device such as a joystick. Since video computer games respond in the same manner when given the same input, video computer games lack variability. Often players find a video computer game trite after playing it numerous times and memorizing the appropriate inputs necessary to achieve the desired result.

Computers are not used only to play video computer games, of course. A large and growing number of people use the computer to communicate with others. E-mail and the World Wide Web are available to millions of people around the world. Interactive games, quiz games, mind games, and games of truth can be played over computer networks and the Internet.

Recently, "chat rooms" and other computer conferencing systems have become increasingly popular. Chat rooms permit computer users to communicate over the Internet, an on-line service, or other computer network, by displaying typed messages, sound clips, and video images as they are entered by each user in the chat room. Chat rooms provide a forum for discussing subjects such as business, sex, theater, hobbies, and sports. Chat rooms are an increasingly popular form of entertainment.

The goal of video computer games and computer conferencing systems is to excite, entertain, and impart information to the user. However, current video computer games and computer conferencing systems have no way of determining whether the user is indeed excited or entertained by the activity, because video computer games and other forms of computer entertainment utilize only the user's voluntary responses. In one video computer game, for example, good eye-hand coordination or the ability to run in place on a pressure sensitive pad while controlling a joystick in response to visual and auditory signals may be the only inputs required. In another video computer game, the user's problem solving ability may be all that is required. Since users can easily memorize the voluntary inputs needed to win a video computer game and the video computer game responds the same way each time to a given voluntary input, the video computer game becomes predictable and, ultimately, boring.

While all video computer games and computer conferencing systems require intentional and voluntary inputs from the user, the emotional state of the user remains undetected and unused. In order for the user to express his emotional state, the user must perform a voluntary act. Currently, users attempt to convey their emotions to other computer users by using various symbols (e.g., the symbol ":-)" represents a smile). In all these activities, the user is usually limited to input from a keyboard, mouse, microphone, video camera, or other voluntary input device. However, the actual emotional state of the user is never directly input to the computer.

By restricting the input of the computer to voluntary acts by the user, the ability of the computer to be used as a means of communication is greatly limited. While communicating over a computer, a user has no means to communicate his emotional state based upon actual physiological or autonomic nervous system responses while communicating other information voluntarily. Similarly, a user receiving information has no way of "sensing" the emotional state of the other computer user.

Computers have been used to collect data about the autonomic responses of a subject in the context of medical monitoring and treatment. In U.S. Pat. No. 5,441,047, an ambulatory patient health monitoring system is disclosed where a patient is monitored by a health care worker at a central station while the patient is at a remote location. Various items of medical condition sensing and monitoring equipment are placed in the patient's home, depending on the particular medical needs of the patient. The patient's medical condition is sensed and measured in the home, and the data are collected by a computer and transmitted to the central station for analysis and display. The health care worker then is placed into interactive visual communication with the patient so that the health care worker can assess the patient's general well being as well as the patient's medical condition.

In another medical application, signals from a patient's heart are fed to a computer for analysis and generation of a display indicative of the patient's heart rate. The heart rate information is presented to the patient. Then, the patient concentrates on the heart rate information display in an attempt to lower his heart rate. This type of "bio-feedback" is a clinical tool that is commonly used to teach patients to control certain of their autonomic functions.

Computers have also used physiological data to control a simulation game. U.S. Pat. No. 5,470,081 discloses a golf simulator which monitors brain waves to control the flight of a simulated golf ball. If the monitored brain waves suggest a high level of concentration, the simulator causes the ball to fly straight. If the monitored brain waves suggest excitement, and thus a lower degree of concentration, the simulator causes the ball to hook or slice. The monitored brain waves exclusively control the flight of the ball, and the flight of the ball is not responsive to any voluntary inputs from the player.

U.S. Pat. No. 4,358,118 discloses a quiz game which uses a physiological response. A computer measures the user's skin resistance in response to a posed question. Then, the user's skin resistance, which indicates to the user how he is reacting to the question, is displayed by the computer. The user then voluntarily enters a response to the question using the computer keyboard based on the displayed skin resistance. The computer selects the next question based on his answer to the previous question and thus guides the user through a programmed series of questions. The computer responds solely to the user's voluntary answer to the question.

Physiological responses are also used in communications contexts. In U.S. Pat. No. 5,047,952, a communication system using an instrumented glove is disclosed for deaf, deaf and blind, or non-vocal individuals. Strain gage sensors in the glove detect movements of the user's hand. The movements detected by the sensors are transmitted to a computer which translates the movements into letters, words, or phrases. The output devices for communicating depend on the visual, vocal, and hearing capabilities of the individuals and can be selected from a voice synthesizer, LCD monitor, or Braille display. The computer responds only to the user's voluntary inputs.

As all of these examples illustrate, prior to the present invention computers have not used a combination of user voluntary and autonomic responses to control a computer system to provide a more realistic game experience or more complete communication of information.

The present invention utilizes both a user's voluntary actions and the user's autonomic nervous system responses as an indicator of emotions to allow for more intimate interaction with other computer users in computer conferencing systems and for more engaging and exciting simulators, video computer games, entertaiunent programs, and other interactive programs. The detection of the user's voluntary actions and autonomic nervous system responses enables the computer to respond to both the user's emotional state and voluntary actions.

SUMMARY OF THE INVENTION

The present invention is directed to an interactive computer system responsive to a user's voluntary and autonomic nervous system responses. The interactive computer system includes a computer, a voluntary input device requiring intentional actuation by the user in communication with the computer, a sensor for detecting an autonomic nervous system response of a user and generating a signal representative thereof, and an interface device in communication with the sensor and the computer for transmitting the signal generated by the sensor to the computer. The computer is responsive to the signal and the voluntary input device and produces an output command which is in part dependent upon the signal and in part dependent upon the voluntary input device. The system also includes an output device responsive to the output command produced by the computer for communicating with the user.

The invention also encompasses a method of controlling the output of a computer, comprising the steps of detecting an autonomic nervous system response of a user, converting the detected autonomic nervous system response into a digital signal, transmitting the digital signal to a computer, processing the digital signal in a computer program in the computer and generating output data in part dependent upon the digital signal, and configuring the output of the computer in response to the generated output data and providing the computer output to the uses in a form that can be sensed by the user.

BRIEF DESCRIPTION OF THE DRAWINGS

For the purpose of illustrating the invention, there are shown in the drawings forms which are presently preferred; it being understood, however, that this invention is not limited to the precise arrangement and instrumentalities shown.

FIG. 2 is a table of physiological signals and transducers which detect those signals.

FIG. 4 is a table of four physiological responses which vary with six emotions.

DETAILED DESCRIPTION OF THE DRAWINGS

The invention is an interactive computer system comprising a computer, a voluntary input device, a sensor to detect autonomic nervous system responses of a user, an interface device, and an output device. The invention is described below according to a first embodiment, with the understanding that several other embodiments are possible that may employ similar components to those in the described invention and are, thus, within the scope of the invention.

Figure 1:
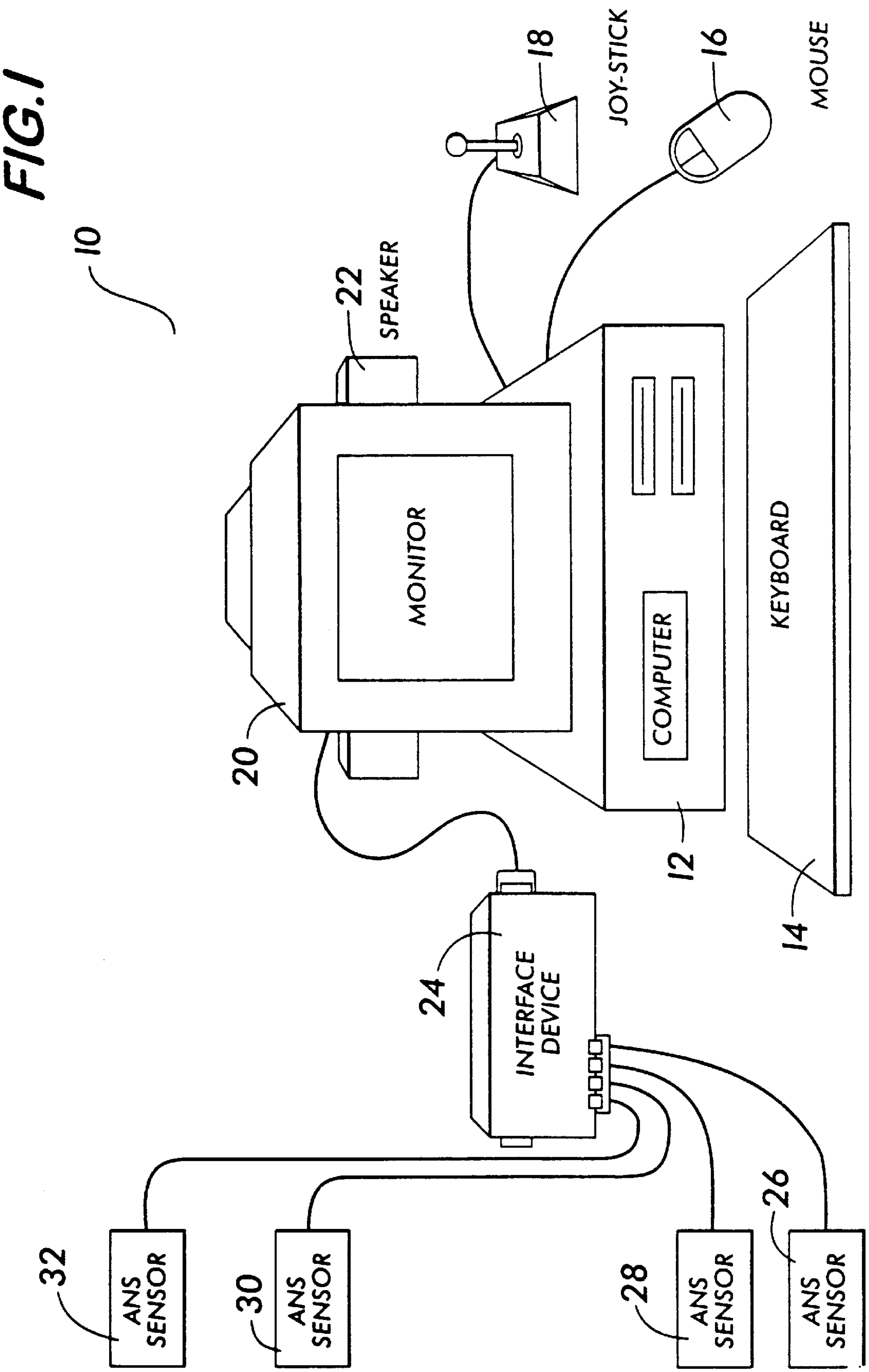
FIG. 1 is a block diagram of one embodiment of the invention.

Referring to FIG. 1, the invention 10 comprises a computer 12 with at least one voluntary input device and at least one output device. As used herein, the term "computer" is to be understood in its broadest sense as a programmable machine which performs high-speed processing of data. In that sense, computer 12 can encompass a microcontroller, a microprocessor, a specially programmed machine incorporating instructions in ROM, PROM, or other firmware, a specially programmed machine incorporating instructions which are hardwired in, or a general purpose computer having associated with it a computer program. The computer program may be, but is not limited to, a communication program, an interactive game program, or other entertainment program.

Voluntary input devices such as keyboard 14, mouse 16, and joystick 18, shown in FIG. 1 as only a few examples of voluntary input devices, require intentional actuation by the user. Though keyboard 14, mouse 16, and joystick 18 are the only voluntary input devices depicted, any of a variety of input devices such as a track ball, touch pad, touch screen, microphone, or the like may be employed. Output devices depicted in FIG. 1 are monitor 20 and speakers 22. The monitor 20 may be a cathode ray tube (CRT), liquid crystal display (LCD), or the like.

Sensors 26, 28, 30, and 32 detect autonomic nervous system responses of a user, such as the user's heart rate, galvanic skin resistance, blood pressure, and respiration, respectively, and generate outputs which are signals representative of a physiological or emotional condition of the user. Sensors to detect other autonomic nervous system responses may also be used. As long as at least one physiological or emotional condition is detected, any number and variety of autonomic nervous system sensors may be used. For example, one embodiment of the invention might use a blood pressure sensor and a respiration sensor together to detect the emotion fear.

FIG. 2 is a table containing various physiological signals, the source of each physiological signal, and transducers which detect each physiological signal. The sensors may include, but are not limited to, the transducers listed in the table of FIG. 2.

Referring again to FIG. 1, the invention further comprises an interface device 24. The interface device 24, which can be located within or outside of computer 12, communicates with the computer 12 and the sensors 26, 28, 30, and 32. The sensors 26, 28, 30, and 32 generate and transmit signals which are representative of the detected autonomic nervous system signals. The interface device 24 receives and conditions the signals from the sensors 26, 28, 30, and 32 to signals suitable for computer 12. The conditioning of the signals may consist of amplifying, filtering, and converting analog signals to digital signals. In the embodiment in FIG. 1, the interface 24 receives analog signals from sensors 26, 28, 30, and 32 and amplifies, filters, and converts the analog signals to digital signals. The digital signals are then transmitted by interface device 24 to computer 12.

In another embodiment, each sensor may have an interface device 24 incorporated within it. In such an embodiment, each sensor would detect the autonomic nervous system response and transmit a digital signal representative of the response directly to computer 12.

The computer 12 analyzes the signals it receives from the voluntary input devices 14 and the signals it receives from the sensors 26, 28, 30, and 32, either directly or through interface device 24, and generates an output command. The output command is in part dependent on the signals from the sensors 26, 28, 30, and 32, and is transmitted to either or both output devices, namely monitor 20 and speakers 22, as may be desired.

Output devices may include, but are not limited to, those for communicating to the user through such media as sight, sound, smell, and touch. Other output devices may include, but are not limited to, a printer, robot arm, disk drive, and a device for applying a tactile sensation to the user. With respect to the device for applying a tactile sensation to the user, the tactile sensation can be generated by several different mechanisms including an inflatable balloon, electromagnetic vibrator, piezoelectric vibrator, and the like. The forces on the skin as a result of the mechanism can be constant or varying depending upon the desired response.

Figure 3:
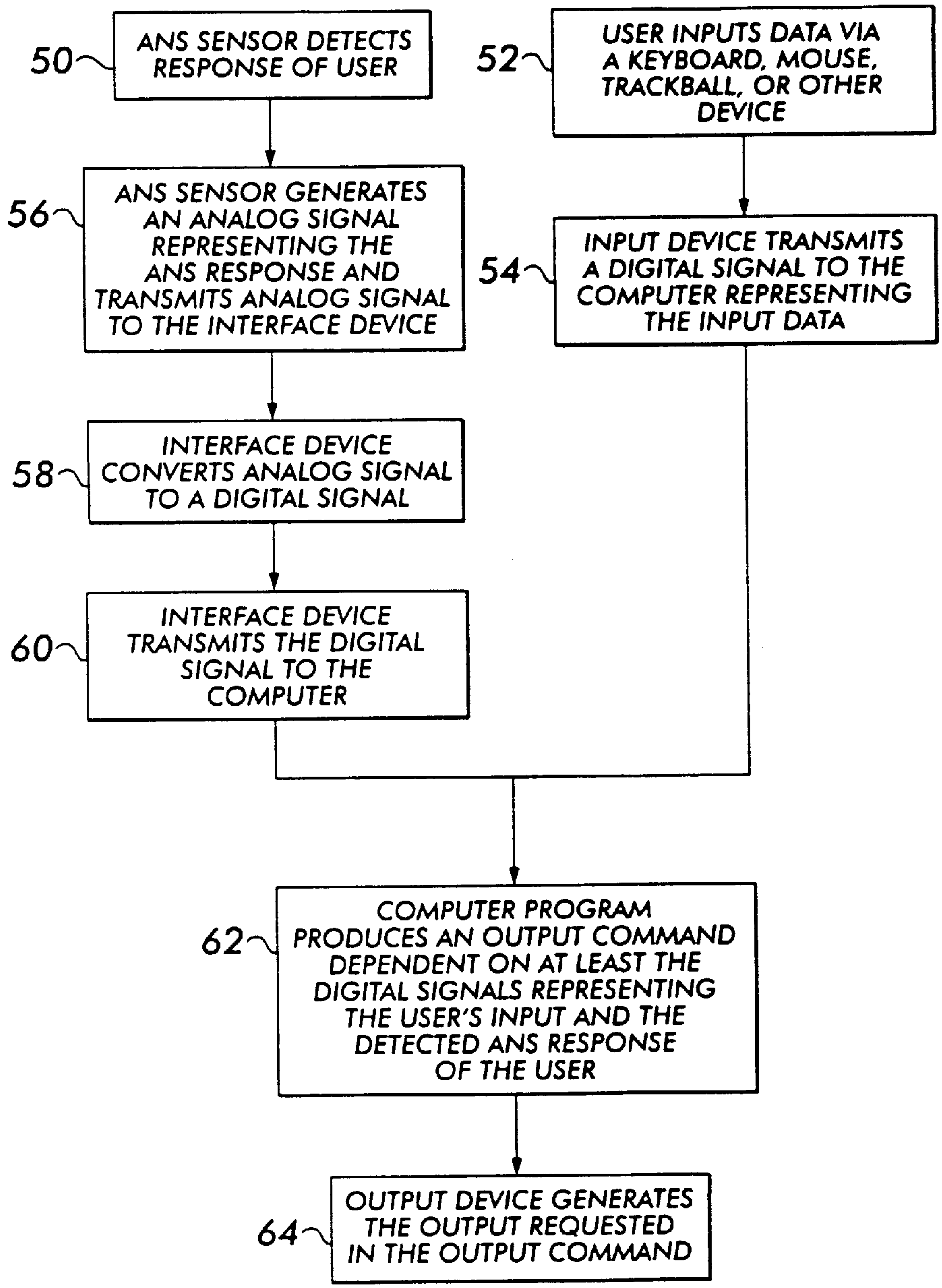
FIG. 3 is a flow chart illustrating the operation of the embodiment of the invention in FIG. 1.

FIG. 3 is a flow chart of the interactive computer system of FIG. 1, showing its operation. The sensors 26, 28, 30, and 32 detect autonomic nervous system responses of a user to a given stimulus (block 50). The sensors generate analog signals representative of the detected autonomic nervous system responses and transmit the analog signals to interface device 24 (block 56). The interface device 24 converts the analog signal transmitted by the sensors to digital signals (block 58). Thereafter, the interface 24 transmits the digital signals to the computer 12 (block 60). At the same time, the keyboard 14, mouse 16, and/or joystick 18 detect the user's voluntary input (block 52) and transmit the detected input as digital signals to computer 12 (block 54).

Once the digital signals transmitted by interface device 24 are received by computer 12, computer 12 produces an output command which is in part dependent upon the digital signals representing the detected autonomic nervous system responses of the user (block 62). Computer 12 transmits the output command to the appropriate output device where the output device generates the output expressed in the output command (block 64).

The table in FIG. 4 illustrates an example of four common physiological responses in response to six emotions: acute stress, anxiety, excitement, embarrassment, fear, and relaxation. The symbols "↑", "↗", "-", and "↓" represent a large increase, a small increase, no change, and a decrease in the associated physiological state of the user, respectively. By observing the four physiological responses of heart rate, blood pressure, respiration, and galvanic skin resistance, for example, as detected by sensors 26, 28, 30, and 32, the user's emotional state with respect to these six emotions can be assessed. Sensing greater or fewer physiological responses can increase or decrease the ability to discern the user's emotional state. By calibrating the sensors for a specific user, a more accurate assessment of the user's emotions can be determined.

In the embodiment illustrated in FIG. 1, the output command produced by computer 12 is a function of the user's emotional state, as determined by the table in FIG. 4, and the user's voluntary input. Alternative embodiments using different functions dependent on different autonomic nervous system signals and voluntary inputs may be used.

The present invention may be embodied in a video game system. In such a game, the player has voluntary input game controls, such as a game paddle, to control a character's movement in the game. In addition, the player's heart rate and galvanic skin response are monitored by the computer through heart rate and galvanic skin response sensors. As the player's stress level rises, as measured by a heart rate and galvanic skin resistance change, the character's speed and strength is correspondingly altered by the computer 12. The speed and strength of the character could be altered in such proportion and direction as a real life character would experience.

Figure 5:
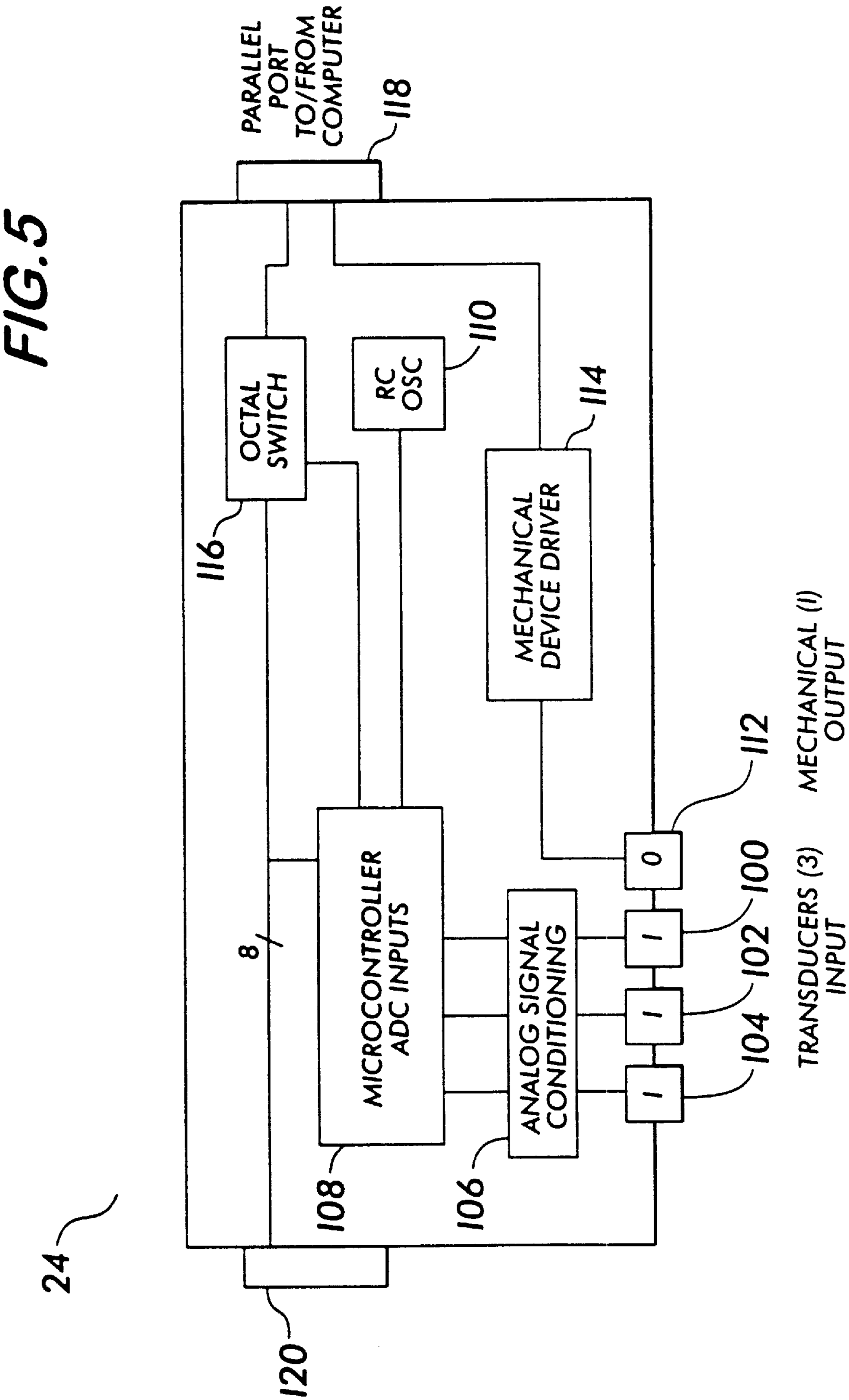
FIG. 5 is a block diagram of an interface device usable with the invention.

One possible embodiment of interface device 24 is illustrated in FIG. 5. Transducer inputs 100, 102, and 104 receive the analog signals from the autonomic nervous system sensors. Interface device 24 may, of course, have any number and variety of transducer inputs, and is not limited to three inputs. Analog signal conditioner 106 amplifies and filters the analog signals received by transducer inputs 100, 102, and 104. Microcontroller 108 receives the amplified and filtered analog signals from analog signal conditioner 106 and converts the analog signals to digital signals. RC oscillator 110 controls the timing of microcontroller 108. After the analog signals are converted to digital signals, microcontroller 108 transmits the digital signals to the computer via octal switch 116 and parallel port 118, which is connected to the computer 12.

Mechanical transducer output 112 receives signals from mechanical device driver 114 and sends these signals to a connected mechanical output device. Interface device 24 may have any number and variety of mechanical transducer outputs. Parallel port 118 can also serve as a source of control signals for mechanical device driver 114. Alternatively, mechanical device driver 114 can be controlled by microcontroller 108.

Octal switch 116 directs the digital signals between parallel port 118, parallel port 120, and microcontroller 108. Parallel port 120 is provided to allow a user to connect a parallel port device, such as a printer, while having the interface device connected to a computer. In an alternative embodiment of interface device 24, the parallel ports 118 and 120 could instead be serial ports, SCSI ports, or other interface ports.

In another embodiment, the interface device 24 is able to transmit output commands as well as receive analog signals through transducer inputs 100, 102, and 104. Output commands received by the interface device 24 from the computer 12 are transmitted through the appropriate transducer inputs 100, 102, and 104 to the connected output device. For example, computer 12 needs to communicate via only one of the transducer inputs of interface device 24 to receive data from and send output commands to an apparatus having an autonomic nervous system sensor and an output device.

Figure 6A:
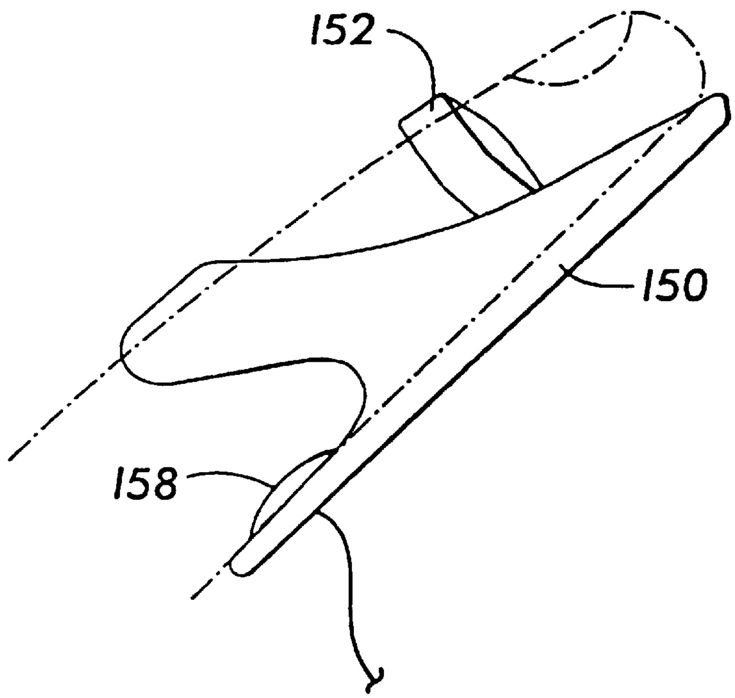
FIG. 6 is a diagram of an input-output device usable with the interactive computer system.
Figure 6B:
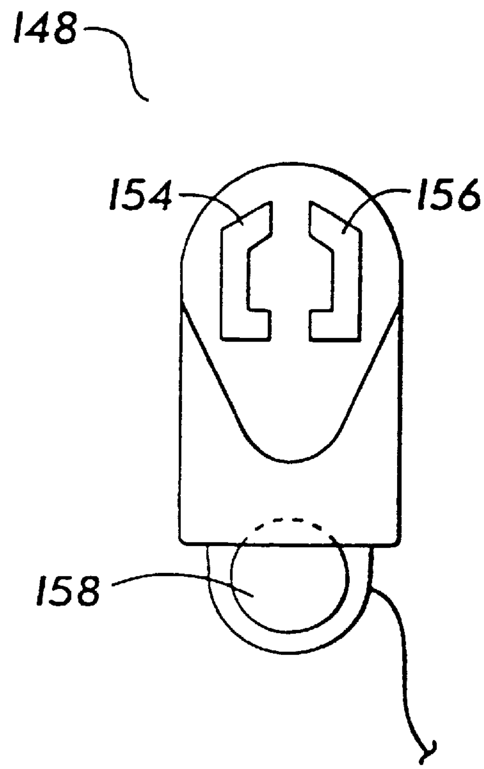

FIG. 6 illustrates one embodiment of an input-output device 148 well suited for use with the interactive computer system of the invention. The input-output device 148 has a body 150 and a strap 152 to permit the device to receive and be secured to a user's finger. In alternative embodiments of input-output device 148, the body 150 and strap 152 can be designed to permit the device to receive other body parts, such as a user's toe, wrist, torso, and so forth. The strap could be tape, hook and loop fastener, or any other material or holding means. Electrodes 154 and 156 are mounted on the surface of body 150 so that when a user's finger engages the device, the electrodes 154 and 156 are in contact with and bridged by the skin on the user's finger, across which the electrodes can accurately measure galvanic skin resistance, for example. Preferably the electrodes 154 and 156 are silver-silver chloride (Ag/AgCl) electrodes, but they also can be made of copper or other conductive material. In addition, body 150 has a pressure applying device 158 mounted on its surface which is able to apply pressure against the user's finger to provide a tactile sensation to the user. In one embodiment, the pressure applying device 158 is an inflatable membrane. The membrane can be inflated in such a manner as to cause pulsations, or apply constant pressure, or the like. Output devices other than pressure applying devices may also be used on input-output device 148. For example, the holder may have electrodes which contact the user's skin in order to provide a harmless but noticeable shock. Alternatively, input-output device 148 could output or generate heat, vibration, or other physical or chemical changes.

In an alternative embodiment of the input-output device 148 in FIG. 6, the inflatable membrane is used as a sensor to measure the user's heart rate and as a pressure applying output device.

Another form of input-output device is a "glove" input-output device that contains between one and five of the input-output devices 148. The individual input-output devices engage the user's fingers when the glove is placed on the user's hand. By having several devices 148, the user's emotional state can be more accurately determined. Furthermore, the use of numerous devices 148 on the hand may create a more vivid experience for the user. In yet another embodiment, the glove input-output device has a plurality of pressure applying or other output devices.

Figure 7:
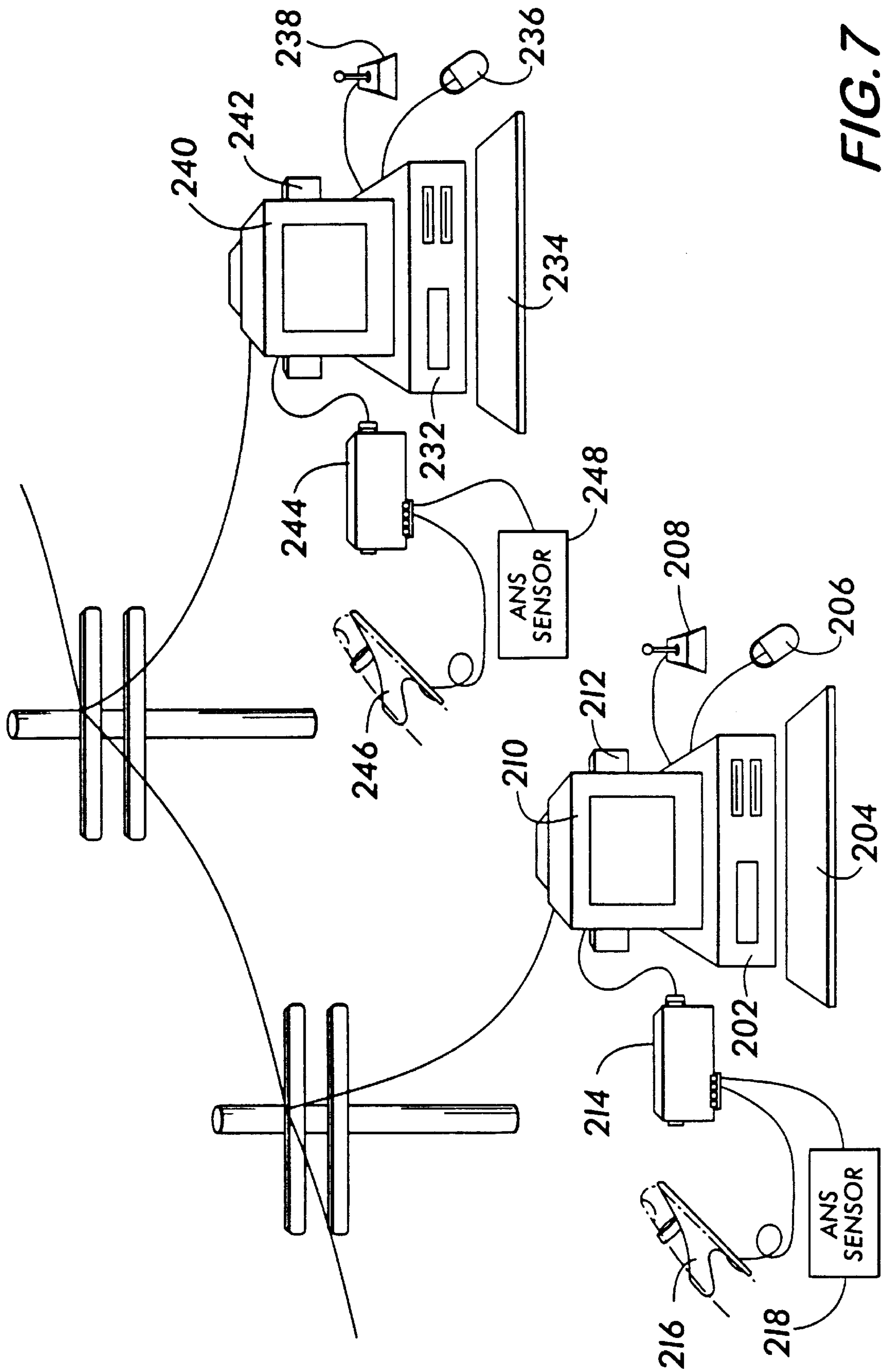
FIG. 7 is a diagram of the present invention, as used in conjunction with a computer network.

FIG. 7 depicts a network configuration of the present invention, showing two computers 202 and 232 connected together via a network. The two computers 202 and 232 each have three voluntary input devices, namely keyboards 204 and 234, mouse 206 and 236, and joysticks 208 and 238, respectively, and two output devices, namely monitors 210 and 240 and speakers 212 and 242, respectively. This, of course, is only one possible configuration. Each computer can have any variety of input and output devices attached. Interface devices 214 and 244 communicate with computers 202 and 232 respectively. Input-output devices 216 and 246, which are illustrated in FIG. 6, and sensors 218 and 248 are attached to interface devices 202 and 232, respectively.

The autonomic nervous system responses of a user of computer 202 are detected by an appropriate sensor in input-output device 216 and sensor 218. The autonomic nervous system responses are transmitted to interface device 214 as analog signals. Interface device 214 converts the received analog signals into digital signals and sends the first digital signals to computer 202. Computer 202 interprets the first digital signals representing the detected autonomic nervous system responses of the user and transmits a second digital signal containing an output command to computer 232. Computers 202 and 232 are connected by a suitable communications medium, such as the Internet, modems, parallel cable, serial cable, local area network, wide area network, or other network connecting device. Upon receipt of the second digital signal, computer 232 transmits the output command to the appropriate output device. The output device produces the output communicated in the output command.

For example, assume a first user operating computer 202 is communicating with a second user operating computer 232 in a "chat room" session. When computer 202, based on the responses from the sensors 216 and 218, detects that the first user is happy, computer 202 may send to computer 232 an output command to display a happy face on the second user's screen. If the first user is experiencing acute stress, computer 202 may instruct computer 232 to activate the pressure applying device in input-output device 246.

In an alternative embodiment of the network configuration of the present invention as depicted in FIG. 7, computer 202 sends the digital signals themselves, representing the detected autonomic nervous system responses of the user of computer 202, to computer 232, instead of sending an output command. Upon receipt of the digital signals, computer 232 interprets the digital signals and sends an output command to the appropriate output device connected to computer 232. The output device produces the output communicated in the output command.

The present invention may be embodied in other specific forms without departing from the spirit or essential attributes thereof and, accordingly, reference should be made to the appended claims, rather than to the foregoing specification, as indicating the scope of the invention.

We claim:

1. An interactive computer system comprising:

an input device for sensing a voluntary input by a user and generating a first signal representative thereof:

a sensor for sensing an autonomous nervous system response of the user and generating a second signal representative thereof;

a computer for executing a computer program, said program being responsive to the first and second signals in a manner that alters the execution of the program in a preselected way;

an output command generated by the program, said output command being based at least in part upon the first and second signals; and an output device responsive to the output command for communicating with the user without cognitively conveying information representative of the user's autonomic nervous system response to the user and without inducing the user to voluntarily alter the user's autonomic nervous system response.

2. The interactive computer system in claim 1, wherein the computer is a programmable controller.

3. The interactive computer system in claim 1, wherein the computer is a microprocessor.

4. The interactive computer system in claim 1, wherein the computer comprises a general purpose computer.

5. The interactive computer system in claim 1, wherein the system comprises a plurality of input devices.

6. The interactive computer system in claim 5, wherein the plurality of input devices includes input devices of different types.

7. The interactive computer system in claim 6, wherein the plurality of input devices includes at least one of a keyboard, a mouse, a joystick, and a trackball.

8. The interactive computer system of claim 1 further comprising an interface device that converts the signal generated by the sensor into a digital signal and transmits the digital signal to the computer.

9. The interactive computer system in claim 8, wherein the interface device amplifies the signal generated by the sensor and transmits the signal to the computer.

10. The interactive computer system in claim 8, wherein the interface device filters the signal generated by the sensor and transmits the signal to the computer.

11. The interactive computer system in claim 1, wherein the system comprises a plurality of sensors.

12. The interactive computer system in claim 11, wherein the plurality of sensors includes sensors of different types.

13. The interactive computer system in claim 12, wherein the plurality of sensors includes at least one of a blood pressure sensor, a heart rate sensor, a respiration rate sensor, and a galvanic skin resistance sensor.

14. The interactive computer system in claim 11, wherein the plurality of sensors includes a sensor apparatus comprising a. a holder for receiving a body part of a user, b. a plurality of electrodes located on the holder and bridged by the user's body so that the user's body contacts the electrodes, the electrodes being connectable to a circuit for measuring a first physiological response of the user, and c. a mechanical sensor connected to the holder for detecting a second physiological response of the user.

15. The interactive computer system as in claim 14, wherein the electrodes for measuring the first physiological response of the user are arranged to measure skin galvanic response.

16. The interactive computer system as in claim 14, wherein the mechanical sensor is a blood pressure sensor.

17. The interactive computer system in claim 1, wherein the system comprises a plurality of output devices.

18. The interactive computer system in claim 17, wherein the plurality of output devices includes output devices of different types.

19. The interactive computer system in claim 18, wherein the plurality of output devices includes a visually perceptible display.

20. The interactive computer system in claim 19, wherein the display comprises at least one of a CRT and an LCD array.

21. The interactive computer system in claim 17, wherein the plurality of output devices includes at least one of a speaker, a printer, and a device for applying a tactile sensation to the user.

22. The interactive computer system in claim 18, wherein the system comprises a plurality of sensors.

23. The interactive computer system in claim 22, wherein the plurality of sensors includes sensors of different types.

24. The interactive computer system in claim 23, wherein the plurality of sensors and the plurality of output devices include an input-output device comprising:

a. a holder for interfacing with an anatomical part of the body of a user, b. a plurality of electrodes located on the holder and bridged by the user's body so that the user's body contacts the electrodes, the electrodes being connectable to a circuit for measuring galvanic skin response of the user, and c. an inflatable membrane for applying pressure against a portion of the user's body.

25. A method of controlling the output of a computer, comprising the steps of:

sensing an autonomic nervous system response of a user;

converting the sensed autonomic nervous system response into a digital signal;

transmitting the digital signal to a computer executing a computer program;

processing the digital signal in the computer program and generating output data which is at least in part dependent upon the digital signal; and communicating to the user computer output based on the output data without cognitively conveying information representative of the user's autonomic nervous system response to the user and without inducing the user to voluntarily alter the user's autonomic nervous system response.

26. An interactive computer system comprising:

an input device for sensing an intentional user input;

sensor for sensing an autonomous nervous system response of the user representing non-intentional user input;

a computer, having a memory, for executing a computer program, said program being responsive to a combination of the intentional user input and the nonintentional user input in a manner that alters the execution of the program in a preselected way;

an output command generated by the program, said output command being based at least in part upon the intentional user input and at least in part upon the nonintentional user input; and an output device responsive to the output command for communicating with the user without cognitively conveying information representative of the user's autonomic nervous system response to the user and without inducing the user to voluntarily alter the user's autonomic nervous system response.

27. The interactive computer system in claim 26, wherein the system comprises a plurality of output devices for communicating with the user in a plurality of media.

28. The interactive computer system in claim 27, wherein the plurality of media include at least one of sight, sound, and tactile sensations.

29. A combination input-output device for an interactive computer system comprising:

a holder for interfacing with an anatomical part of the body of a user;

a plurality of electrodes located on the holder and bridged by the user's body so that the user's body contacts the electrodes, the electrodes being selectively connectable to a first circuit for measuring a first physiological condition of the user and being selectively connectable to a second circuit for causing a first physiological sensation in the user;

a mechanical device connected to the holder for sensing a second physiological condition of the user and for causing a second physiological sensation in the user.

30. An input-output device as in claim 29, wherein the electrodes are connectable to a circuit for measuring skin galvanic response of the user.

31. An input-output device as in claim 29, wherein the mechanical device detects blood pressure of the user.

32. A networked interactive computer system, comprising:

a first computer operable by a first user, said computer executing a first computer program, the first program being responsive to a sensor signal in a manner that alters the execution of the first program in a preselected way and generating a first output command based at least in part on the sensor signal;

at least one additional computer operable by a second user and being in communication with the first computer, said additional computer executing a second computer program, the second computer program being responsive to the first output command in a preselected way and generating a second output command that is based at least in part on the first output command;

at least one sensor in communication with the first computer for sensing at least one autonomic nervous system response of the first user and generating the sensor signal representative thereof; and at least one output device in communication with the additional computer, said output device being responsive to said second output command and communicating to the second user information representative of the autonomic nervous system response of the first user.

33. The networked interactive computer system as in claim 32, further comprising:

at least one second sensor in communication with the additional computer, said sensor sensing at least one autonomic nervous system response of the second user and generating a second sensor signal representative thereof;

the second computer program being responsive to the second sensor signal in a preselected way and generating a third output command that is based at least in part on the second sensor signal;

the first computer program being responsive to the third output command in a preselected way and generating a fourth output command that is based at least in part on the third output command; and at least one second output device in communication with the first computer, said second output device being responsive to said fourth output command and communicating to the first user information representative of the autonomic nervous system response of the second user.

* * * * *